United States Patent [19]

Argyle et al.

[11] 4,351,390

[45] Sep. 28, 1982

[54] RETAINING CLIPS FOR GASKETED TANKS ON HEAT EXCHANGERS

[75] Inventors: Charles S. Argyle, Willowdale; Ralph G. Nanos, Toronto, both of Canada

[73] Assignee: Borg-Warner Corporation, Chicago, Ill.

[21] Appl. No.: 120,433

[22] Filed: Feb. 11, 1980

[51] Int. Cl.³ .................................................. F28D 1/00
[52] U.S. Cl. ...................................... 165/149; 403/338; 165/154; 29/157.3 R; 285/364; 285/DIG. 22
[58] Field of Search ................ 403/338, 231; 285/364, 285/365, 406, 407, DIG. 22; 165/149, 154, 157; 29/157.3 R

[56] References Cited

U.S. PATENT DOCUMENTS

| 184,599 | 11/1876 | Ehrhardt | 285/364 X |
| 2,065,480 | 12/1936 | Soper | 285/364 X |

FOREIGN PATENT DOCUMENTS 1219395 12/1959 France ............................... 403/338

Primary Examiner—Wayne L. Shedd
Attorney, Agent, or Firm—James A. Geppert

[57] ABSTRACT

A clamping device on heat exchangers that will mechanically force mating parts together to prevent fluid leakage. The clamping device comprises one or more mechanically formed clips or clamps sprung around the rims of mating parts with sufficient force to prevent the faying surfaces from separating during normal use. Gaskets or sealing compounds may be present between the surfaces.

3 Claims, 11 Drawing Figures

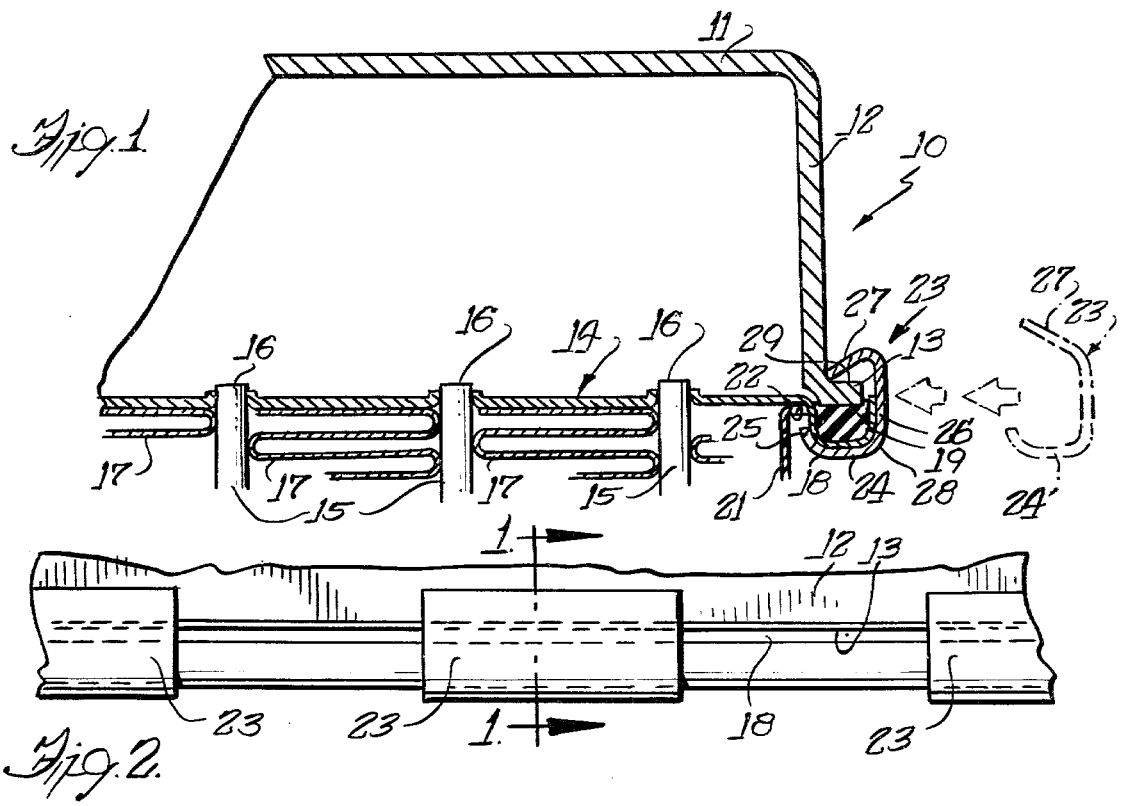
Fig. 1
Fig. 2
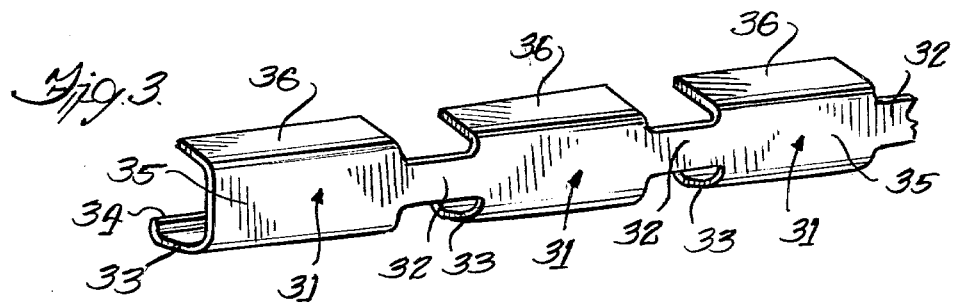
Fig. 3
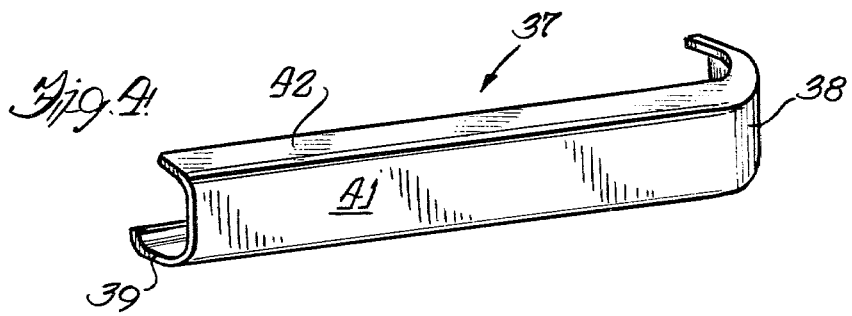
Fig. 4
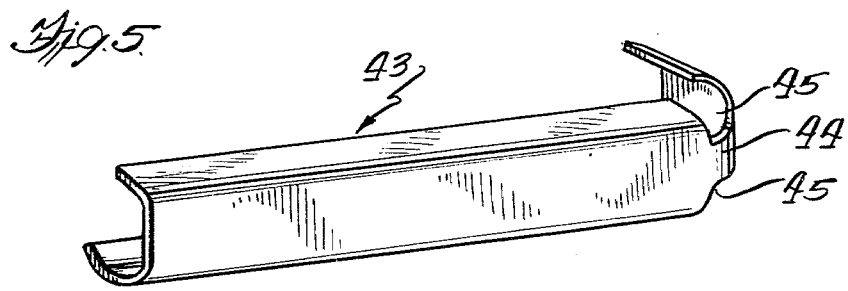
Fig. 5

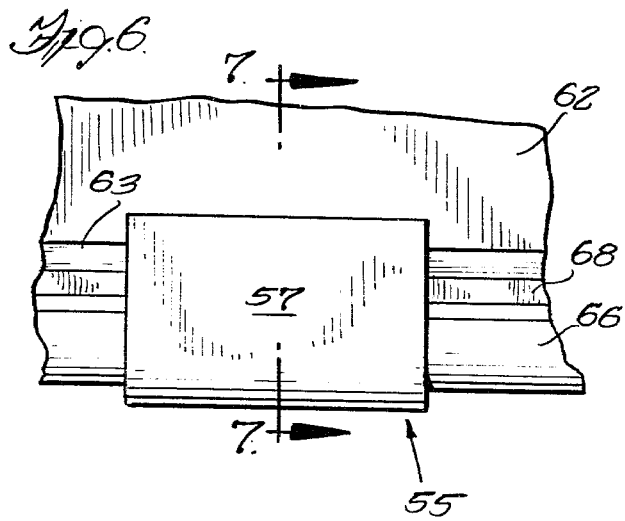
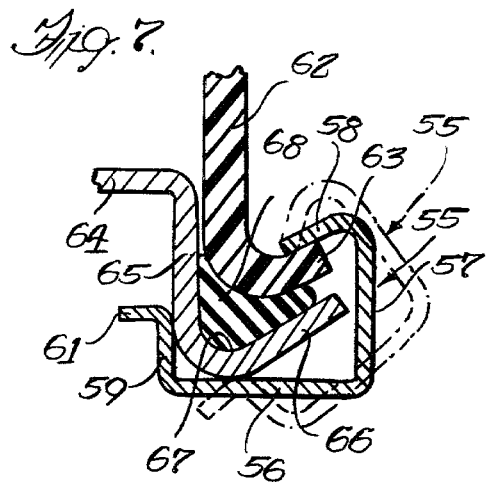
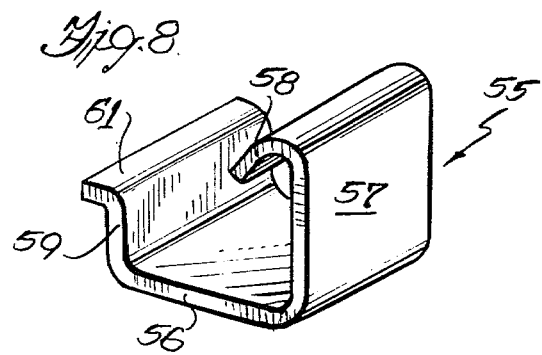
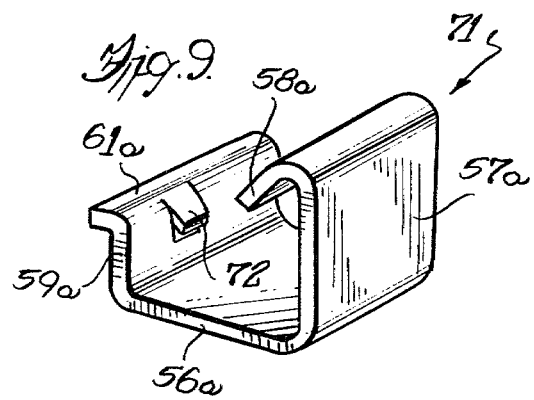
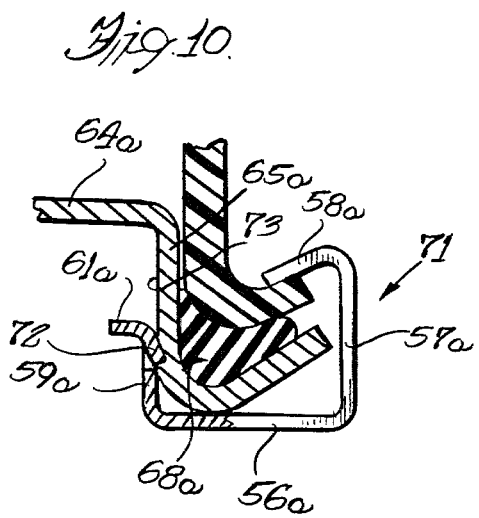
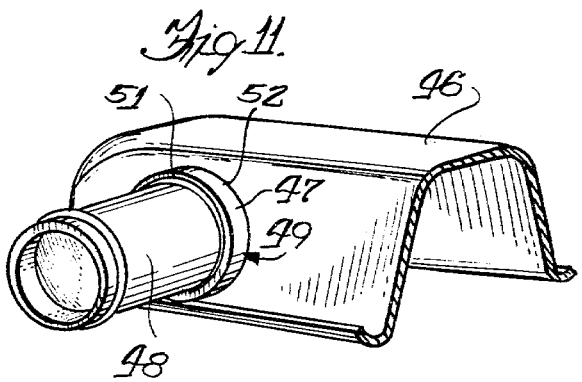

RETAINING CLIPS FOR GASKETED TANKS ON HEAT EXCHANGERS

BACKGROUND OF THE INVENTION

Conventional heat exchangers utilized for internal combustion engines or similar applications generally include distribution headers extending across the opposite ends of heat exchanger cores and receiving a plurality of coolant tubes projecting therethrough to be in fluid communication with inlet and outlet tanks, which are secured to the headers in a liquid-tight condition. Each header and tank is provided with peripheral flanges having openings through which extend clamping bolts to secure the parts together. This is typical in heavy duty radiator applications. Some automotive radiators solder header to tank providing a leakproof joint. Other applications use plastic tanks with metal headers. These headers are formed in such a manner to provide tabs around the periphery of the header. During final assembly these tabs are folded onto the tank thus providing a clamping pressure on a resilient gasket positioned between the flanges to be deformed and sealingly engage the flanges under the pressure exerted by the clamping means to insure a liquid tight joint.

Several problems may arise in the above structural arrangements. One is the problem of galvanic corrosion between the clamping bolts, header and tank. This problem limits the choice of materials to be utilized in the heat exchanger construction. Another problem is that the gasket has to be pierced at spaced intervals to receive the clamping bolts, thus enhancing the problem of leakage if an uneven clamping force exists between adjacent bolts. Also, alignment between the holes in the header, tank and gasket complicates the assembly procedures for the heat exchanger.

Other methods of assembly include bending or crimping operations of one or both flanges formed on the header and tank to join and seal the parts together, however, such operations also require a high degree of alignment of parts and complex joining operations. The present invention overcomes the above problems of sealing radiator parts together by providing a simplified joining technique.

SUMMARY OF THE INVENTION

The present invention relates to a novel clamping means for joining a tube header plate and inlet or outlet tank of a heat exchanger or radiator that will mechanically force the mating parts together to prevent fluid leakage. The clamp is mechanically formed or sprung around the rims of the mating parts with sufficient force to pevent the mating surfaces from separating during normal use.

The present invention also relates to a novel clamping means which may be either a plurality of separate clamping devices or a continuous clamping band with or without a corner portion integral therewith. A gasket or sealant compound may be utilized in the joint to be sealed.

The present invention further comprehends the provision of a novel clamping means which may be utilized for the joining of an outlet or inlet conduit to a flanged opening in a header tank.

A further object of the present invention is the provision of a novel clamping means in the form of individual retaining clips that are assembled onto the tank and header and are easily removed for disassembly and permit reassembly with new clips without damaging the tank or header.

Further objects are to provide a construction of maximum simplicity, efficiency, economy and ease of assembly and disassembly, and such further objects, advantages and capabilities as will later more fully appear and are inherently possessed thereby.

DESCRIPTION OF THE DRAWINGS

FIG. 1 is a partial vertical cross sectional view through the upper inlet tank and header plate portion of a vertical downflow radiator, taken on the line 1—1 of FIG. 2, utilizing the clamping means of the present invention.

FIG. 2 is a partial side elevational view of the joint and clamping means.

FIG. 3 is a perspective view of a segmented clamping band embodiment.

FIG. 4 is a perspective view of a continuous clamping band.

FIG. 5 is a perspective view of a continuous clamping band with corner relief.

FIG. 6 is an enlarged side elevational view of the clamping member that is sprung onto the joint to be sealed.

FIG. 7 is a cross sectional view taken on the line 7—7 of FIG. 6.

FIG. 8 is a perspective view of the clamping member of FIGS. 6 and 7.

FIG. 9 is a perspective view of a clamping member similar to the member shown in FIGS. 6, 7 and 8, but having a locking tab.

FIG. 10 is a vertical cross sectional view of a joint clamped with the member of FIG. 9.

FIG. 11 is a partial perspective view of a radiator tank having a conduit clamped thereto by the clamping means of the present invention.

DESCRIPTION OF THE PREFERRED EMBODIMENTS

Referring more particularly to the disclosure in the drawings wherein are shown illustrative embodiments of the present invention, FIG. 1 discloses the upper portion of a heat exchanger 10, such as a downflow type of automotive radiator, including an inlet tank 11 having depending sides 12 terminating in a peripheral flange 13, a header plate 14 receiving the upper ends 16 of a plurality of tubes 15 which, together with the corrugated heat transfer fins 17, form the heat exchange core of the radiator. The periphery 18 of the header plate is in the form of a channel having a U-shape to receive a resilient gasket 19 therein; the flange 13 resting on the gasket. Also, vertical supporting members 21 having flanges 22 contacting and/or secured to the header plate may partially enclose the tube core.

To sealingly retain the inlet tank 11 and header plate 14 together, one or more retaining clips or clamps 23 generally encompass the flange 13, header plate periphery 18 and sealing gasket 19 to clamp these members together. Each clamp includes a base flange 24 with an upwardly curled inner edge 25, a side wall 26, and an upper flange 27 that is initially inclined upward (in dotted lines of FIG. 1) and, after clamping, is inclined downwardly to clampingly engage the flange 13 of the inlet tank 11. The base flange 24 with curled edge 25 and rounded corner 28 joining the base to side wall 26 generally conforms to the channel shape of the header plate periphery 18, the side wall 26 extends above the upper surface 29 of the flange 13, and the top flange is bent downwardly to engage the flange 13.

As shown in dotted lines in FIG. 1, each open clamp or clip 23 is moved onto the flange 13 and header plate periphery 18, and the upper flange 27 is bent downwardly over the flange 13 to clamp the peripheries and compress the gasket 19 to seal the joint. As shown in FIG. 2, a plurality of retaining clips 23 are longitudinally spaced along the circumference of the tank flange to provide a uniform seal through the length of the gasket. The ends 16 of the tubes 15 are conventionally sealed in openings in the header plate 14 by soldering or resilient circular gasket means.

If fewer parts are desired, the retaining clips 23 can be formed as a substantially continuous strip as shown in FIGS. 3, 4 and 5. In FIG. 3, several clips 31, identical to the clips 23, are formed in a strip through connecting webs 32; each clip comprising a lower flange 33 with an upwardly curled edge 34, a side wall 35 having the connecting webs 32 integral therewith, and an upper flange 36 to be bent downwardly to provide the clamping force.

In FIG. 4, a continuous elongated clip 37 includes an integral corner portion 38; this clip also having a lower flange 39 with a curved edge and an upper flange 42 connected by a side wall 41. The retaining clip 43 of FIG. 5 is similar to the clip 37 except for the relieved portions 45 at the corner 44.

Also, in FIG. 11 an annular clip 49 is utilized to fasten an inlet on outlet conduit 48 to a flanged opening 47 of an inlet or outlet tank 46 of a heat exchanger (not shown). In this embodiment, the conduit 48 is provided with a channel-shaped flange receiving a sealing gasket and the opening 47 is defined by an annular axially and then radially outwardly extending flange. The clip 49 includes a lower flange 51 and side wall 52 which is slipped onto the conduit and over the flanges and then the upper portion of the side wall is bent inwardly to clamp the parts together.

FIGS. 6, 7 and 8 relate to an alternate version of retaining clip 55 which is fully formed prior to utilization on a heat exchanger. The clip includes a flat bottom wall 56, a side wall 57 generally perpendicular to the bottom wall, an inwardly and downwardly inclined top flange 58, and an inner wall 59 generally perpendicular to and formed at the inner edge of the bottom wall 56; the inner wall terminating in an inwardly extending lip 61.

As seen in FIG. 7, the tank wall 62 has an outwardly and slightly upwardly curved flange 63, and the header plate 64 terminates in a downwardly extending wall 65 with an outwardly and upwardly inclined flange 66 integral therewith. The channel 67 formed by the wall 65 and flange 66 receives a resilient sealing gasket 68 therein on which the flange 63 rests. As shown in dotted lines in FIG. 7, the clip 55 has the top flange 58 slipped over the edge of the tank flange 63 with the remainder of the clip extending generally downward. The clip is then rotated clockwise until the inner wall 59 snaps behind the depending wall 65 of the header plate 64 as shown in solid lines in FIG. 7. As in the version of FIGS. 1 and 2, several of the clips 55 are longitudinally spaced along the circumference of the tank and header plate.

FIGS. 9 and 10 disclose an alternate version of clip 71 with like parts having the same reference numeral with a script a. The clip includes a bottom wall 56a, side wall 57a, inclined top flange 58a, and an inner wall 59a terminating in an inwardly extending lip 61a. Punched out of the inner wall 59a is an inwardly and downwardly extending retaining tab 72. This tab has the function of engaging or biting into the inner surface 73 of the depending wall 65a of the header plate 64a (FIG. 10) when the clip is snapped onto the flanges to compress the gasket 68a; the tab acting to prevent removal of the clip.

The various clips shown in these figures are suitable to retain the inlet tank or outlet tank and the header plate together in a sealing relationship with a sealing gasket compressed therebetween. These clips are particularly adapted to a heat exchanger structure where the inlet and outlet tanks are formed of a suitable plastic material to provide a lighter and less corrosive heat exchanger or radiator. Although shown for a vertical downflow radiator, the clips would be equally adaptable to a cross-flow heat exchanger or radiator.

We claim:

1. A retaining clip for use in securing a tank and a header plate of a heat exchanger together in a fluid tight relationship, the tank and the header plate each having a peripheral flange receiving a resilient sealing gasket therebetween, the header plate flange having a depending portion and an outwardly and upwardly inclined portion defining a channel receiving said gasket, the retaining clip comprising a base portion joining a pair of oppositely disposed substantially parallel walls completely formed prior to assembly, said one wall extending behind the depending flange portion of said header plate flange, and the opposite wall being positioned beyond said peripheral flanges and terminating in an inwardly inclined flange engaging the tank flange to compress the sealing gasket, the inclined clip flange initially contacting said tank flange and the clip is rotated to snap under said header plate flange.

2. A retaining clip as set forth in claim 1, in which a plurality of clips are circumferentially spaced around the periphery of the tank and header plate.

3. A retaining clip as set forth in claim 1, in which a retaining tab is partially punched out of said inner wall and is inclined inwardly to engage said depending portion of the header plate flange so as to resist disengagement of said clip.

* * * * *